United States Patent [19]

Masuda

[11] Patent Number: 4,898,350
[45] Date of Patent: Feb. 6, 1990

[54] VEHICLE-METER-HOUSING MOUNTING BRACKETS

[75] Inventor: Takahiro Masuda, Shizuoka, Japan
[73] Assignee: Yazaki Corporation, Tokyo, Japan
[21] Appl. No.: 256,798
[22] Filed: Oct. 12, 1988
[30] Foreign Application Priority Data Oct. 12, 1987 [JP] Japan ................. 62-155732

[51] Int. Cl.$^4$ .............................................. G12B 9/00
[52] U.S. Cl. ................................................ 248/27.1
[58] Field of Search ...................... 248/27.1, DIG. 6
[56] References Cited

U.S. PATENT DOCUMENTS

| 1,808,198 | 6/1931 | Zubafy ...................... 248/27.1 X |
| 2,076,491 | 4/1937 | Allen et al. ................ 248/27.1 X |
| 2,440,324 | 4/1948 | Blakeslee ...................... 248/27.1 |
| 2,518,912 | 8/1959 | Lampe ...................... 248/DIG. 6 X |
| 3,059,045 | 10/1967 | Swartwood ................ 248/27.1 X |
| 4,560,124 | 12/1985 | Alves et al. ................... 248/27.1 |

Primary Examiner—Alvin C. Chin-Shue
Attorney, Agent, or Firm—Sughrue, Mion, Zinn, Macpeak & Seas

[57] ABSTRACT

In a meter housing which is fixedly inserted into an instrument panel with the mounting brackets of the meter housing and the mating brackets of the instrument panel, each of the mounting brackets has a lug which, when the meter housing is inserted into the instrument panel, provides a gap large enough to receive the fingers of the operator between the lug and the instrument panel, so that the meter housing is engaged with or disengaged from the instrument panel with the fingers inserted into the gaps beside the lugs.

5 Claims, 2 Drawing Sheets

VEHICLE-METER-HOUSING MOUNTING BRACKETS

BACKGROUND OF THE INVENTION

This invention relates to brackets for mounting vehicle meter housings (hereinafter referred to merely as "mounting brackets", when applicable).

For instance, in the case of a set-in type vehicle meter, as its meter housing is inserted into the instrument panel through an opening provided therefore, its connectors and cables are engaged with the mating connectors provided on the instrument panel: that is, the connection of the connectors and cables is achieved at the same time when the insertion of the meter housing into the instrument panel is accomplished.

In this operation, mounting brackets on the periphery of the meter housing are aligned with brackets formed on the instrument panel. Under this condition, with the hands inserted from outside, screws are engaged with speed nuts mounted on the brackets, so that the meter housing is fixedly secured to the instrument housing.

However, it should be noted that the above-described operation is carried out with the socket, plug and connectors being not observed: that is, they are connected by intuition. Therefore, in the operation, the meter housing is held by the fingers which are inserted into the narrow space between the hosing and the opening of the instrument panel. However, in this case, the meter housing is not sufficiently held by the fingers, because it has no suitable supporting means. Accordingly, it will take a relatively long time for the hands or fingers to retract from the meter housing thus inserted, and at worst the fingers may be caught therein.

After the meter housing has been fixedly inserted into the instrument panel, it cannot be pulled out without application of great power, because the connectors, etc. are strongly joined together.

Accordingly, there has been a strong demand for an improvement of the meter housing so that it can be readily combined with the instrument panel. On the other hand, in practice, it is impossible to provide large supporting means for the meter housing, because the periphery of the meter housing is set inside the opening of the instrument panel when the meter housing is inserted into the instrument panel.

SUMMARY OF THE INVENTION

Accordingly, an object of this invention is to eliminate the above-difficulties accompanying a conventional meter housing which is fixedly engaged with the instrument panel thereof through brackets.

More specifically, an object of the invention is to provide mounting brackets for such a meter housing which are small in size, not adversely affecting the external appearance, with which the meter housing can be readily engaged with and disengaged from the instrument panel.

The foregoing object and other objects of the invention have been achieved by the improvement of mounting brackets formed on the periphery of a meter housing which is inserted into an instrument panel and is fixedly secured to the instrument panel with the mounting brackets and the brackets of the instrument panel, in such a manner that each of the mounting brackets has a lug on the front side thereof, the lug being integral with the mounting bracket, and having a small width portion which, when the meter housing is inserted into the instrument panel, provides a gap large enough to receive fingers between the middle of the lug and the instrument panel.

The lug is extended forwardly from each of the mounting brackets of the vehicle meter housing in such a manner that it is positioned above the respective bracket of the instrument panel: that is, the fingers can freely reach the lug. Therefore, in fitting the meter housing in the instrument panel, the components can be positioned in place with high accuracy, and when the meter housing held with the fingers is fitted in the instrument panel, the fingers will not be caught therein. The lugs are made flush with the opening of the instrument panel when the operator pushed the meter housing into the instrument panel while removing his fingers from the gaps formed beside the small width portions of the lugs.

The nature, principle and utility of the invention will become more apparent from the following detailed description when read in conjunction with the accompanying drawings.

DETAILED DESCRIPTION OF THE PREFERRED EMBODIMENT

One example of a vehicle meter housing mounting bracket according to this invention will be described with reference to the accompanying drawings.

Figure 1:
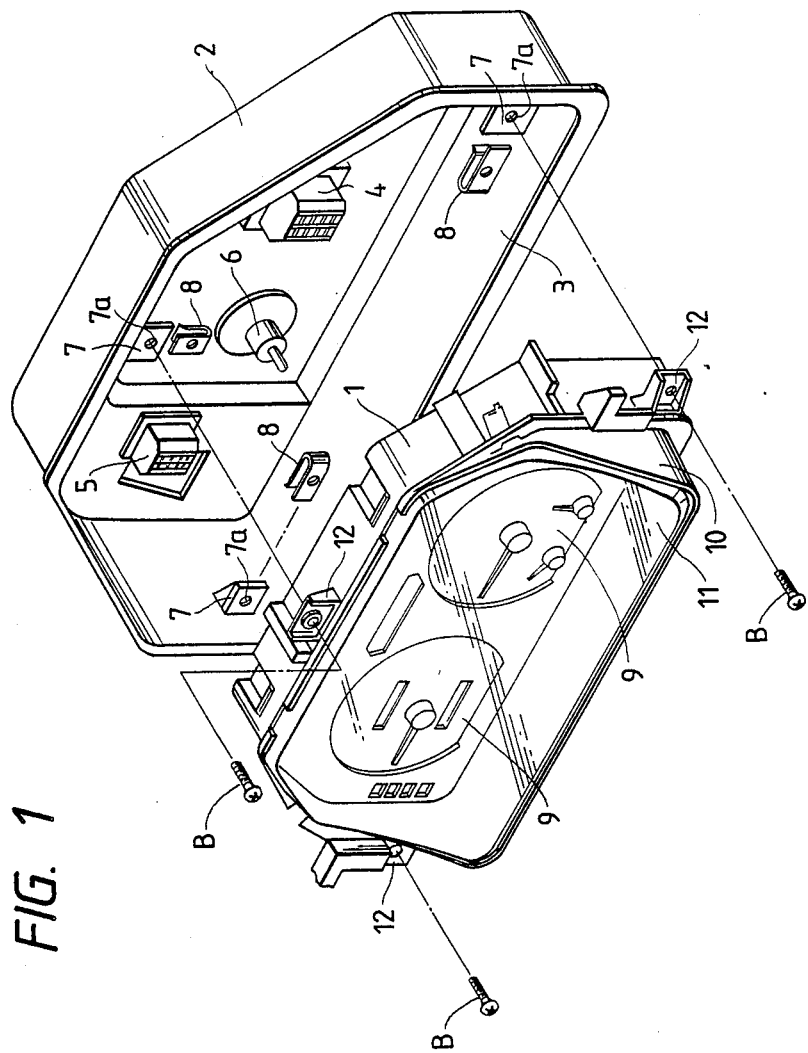
FIG. 1 is an exploded perspective view showing a meter housing with mounting brackets according to this invention which is going to be engaged with an instrument panel.
Figure 2:
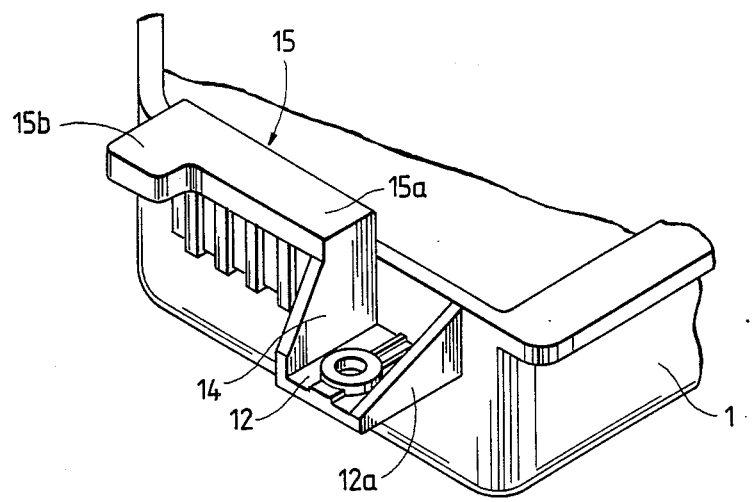
FIG. 2 a perspective view showing essential parts of the housing illustrated in FIG. 1.
Figure 3:
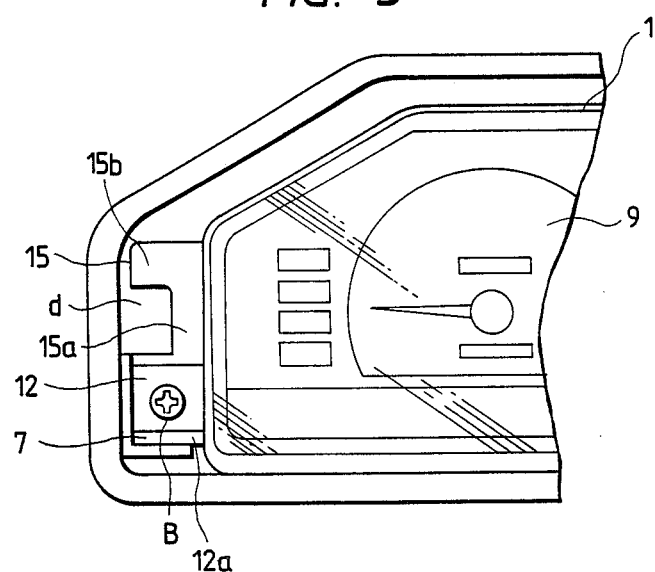
FIG. 3 front view showing part of the mounting bracket of the meter housing which is engaged with the instrument panel.

In FIGS. 1 and 2, reference numeral 1 designates a set-in type housing in which an instrument has been built; and 2, an instrument panel having a meter housing mounting opening 3 in the front. A connector 4 and a plug 6, which are engaged with a connector and a socket (not shown), are extended from the inner surface of the bottom of the instrument panel 2. Brackets 7 each having a through-hole 7a are protruded from the two side parts and the middle of the upper part of the periphery of the opening 3. A speed nut 8 is detachably mounted on each of the brackets 7 as shown in FIG. 1.

The meter housing 1 is molded from ABS resin. The meter housing 1 has a dial plate 9, instruments (not shown) mounted on the dial plate from behind, a facing member 10 surrounding the dial plate, and a transparent cover 11 covering the front of the facing member 10.

Mounting brackets 12 are protruded from the side parts and the middle of the upper part of the front periphery of the meter housing 1 in correspondence to the brackets 7 of the instrument panel 2. With the meter housing 1 inserted in the opening 3 of the instrument panel 2, the mounting brackets 12 are aligned with the brackets 7, respectively. Under this condition, screws B are engaged with the speed nuts 8 mounted on the brackets 7, so that the meter housing 1 is fixedly positioned in the instrument panel 2.

A reinforcing rib 12a is extended from the lower edge of each of the mounting brackets 12 provided on the two side parts of the front periphery of the meter housing, while a step 14 serving also as a reinforcing rib is extended from the upper edge of the mounting bracket 12. The step 14 merges with a lug 15 integral with the meter housing 1. The lug 15 comprises a small width portion 15a merging with the step 14, and a large width portion 15b extended upwardly from the small width portion 15a.

With the lugs 15 as guides, the meter housing 1 can be fitted in the instrument panel 2 through the opening 3 while the relevant components being positioned in place.

When the meter housing 1 has been fitted in the instrument panel 2, the large width portions 15b of the lugs 15 are aligned with the inner edge of the opening of the instrument panel 2, and a gap d large enough to receive two or three fingers is formed between each of the small width portions 15a and the inner edge of the opening, which allows the operator to retract or remove his fingers from the meter housing thus fitted.

When it is required to pull the meter housing from the instrument panel, the gaps d allow the operator to positively hold the meter housing with his fingers so that he can readily pull out the meter housing.

Thus, the gaps d thus provided permit the operator to readily fit the meter housing in the instrument panel or pull the former out of the latter.

As was described above, the lug is extended forwardly from each of the mounting brackets of the vehicle meter housing in such a manner that it is positioned above the respective bracket 7 of the instrument panel: that is, the fingers can freely reach the lug. Therefore, in fitting the meter housing in the instrument panel, the components can be positioned in place with high accuracy, and when the meter housing held with the fingers is fitted in the instrument panel, the fingers will not be caught therein. The lugs are made flush with the opening of the instrument panel when the operator pushes the meter housing into the instrument panel while removing his fingers from the gaps formed beside the small width portions of the lugs.

Thus, according to the invention, the meter housing can be readily engaged with or disengaged from the instrument panel.

What is claimed is:

1. A vehicle meter housing structure comprising:
   an instrument panel having a front opening portion;
   a meter housing inserted into said instrument panel through said front opening portion;
   a pair of mounting brackets formed on a periphery of said meter housing; and
   a pair of lugs, each of said lugs extending forwardly from one of said mounting brackets;
   wherein each of said lugs has a small width portion which provides a gap large enough to receive human fingers between an inner edge of said instrument panel and said lug.

2. The structure according to claim 1, wherein a first reinforcing rib extends from a lower edge of each of said mounting brackets provided on a pair of side parts of a front periphery of said meter housing, and a step serves also as a second reinforcing rib extending from an upper edge of each of said mounting brackets.

3. The structure according to claim 2, wherein each of said lugs has said small width portion merging with said step, and each of said lugs has a large width portion extending upwardly from said small width portion.

4. The structure according to claim 2, wherein each gap is provided between said lug and said second reinforcing rib.

5. The structure according to claim 3, wherein when said meter housing is fitted in said instrument panel, said large width portion of the lug is aligned with an inner edge of said instrument panel through said front opening portion, and said gap large enough to receive human fingers is formed between said small width portion and said inner edge of said instrument panel.

* * * * *